United States Patent [19]
Vokes et al.

[11] 3,772,756
[45] Nov. 20, 1973

[54] CORE HANDLING SYSTEM

[75] Inventors: Robert G. Vokes, Wilmette; William A. Saarima, Park Ridge, both of Ill.

[73] Assignee: Concep Machine Co., Inc., Skokie, Ill.

[22] Filed: Feb. 23, 1972

[21] Appl. No.: 228,557

[52] U.S. Cl............................................ 29/211 R
[51] Int. Cl.............................................. B23q 7/02
[58] Field of Search........................... 214/338, 339; 198/213; 133/3 H; 221/75; 29/211 R, 203 MM, 29/208, 240, 244

[56] References Cited
UNITED STATES PATENTS
2,515,404   7/1950   Grosvenor .................... 214/338 X
3,047,712   7/1962   Morris ............................. 214/338
1,166,537   1/1916   Neal................................... 133/3 H
2,031,894   2/1936   Krakauer......................... 214/338

*Primary Examiner*—Samuel F. Coleman
*Assistant Examiner*—Norman L. Stack, Jr.
*Attorney*—Howard T. Markey et al.

[57] ABSTRACT

A mechanism for locating and positioning cylindrical cores on a mandrel includes three spaced threaded rods driven in the same direction and having substantially identical threads. A chute is positioned above the space defined between the threaded rods, with the cores passing from the chute to a position in which the cores are supported on the threads. The threaded rods, during rotation, carry the cores in spaced relation onto a mandrel which is positioned between the threaded rods. The cores are located and positioned in a precise spaced relationship on the mandrel by the rotating threaded rods.

10 Claims, 3 Drawing Figures

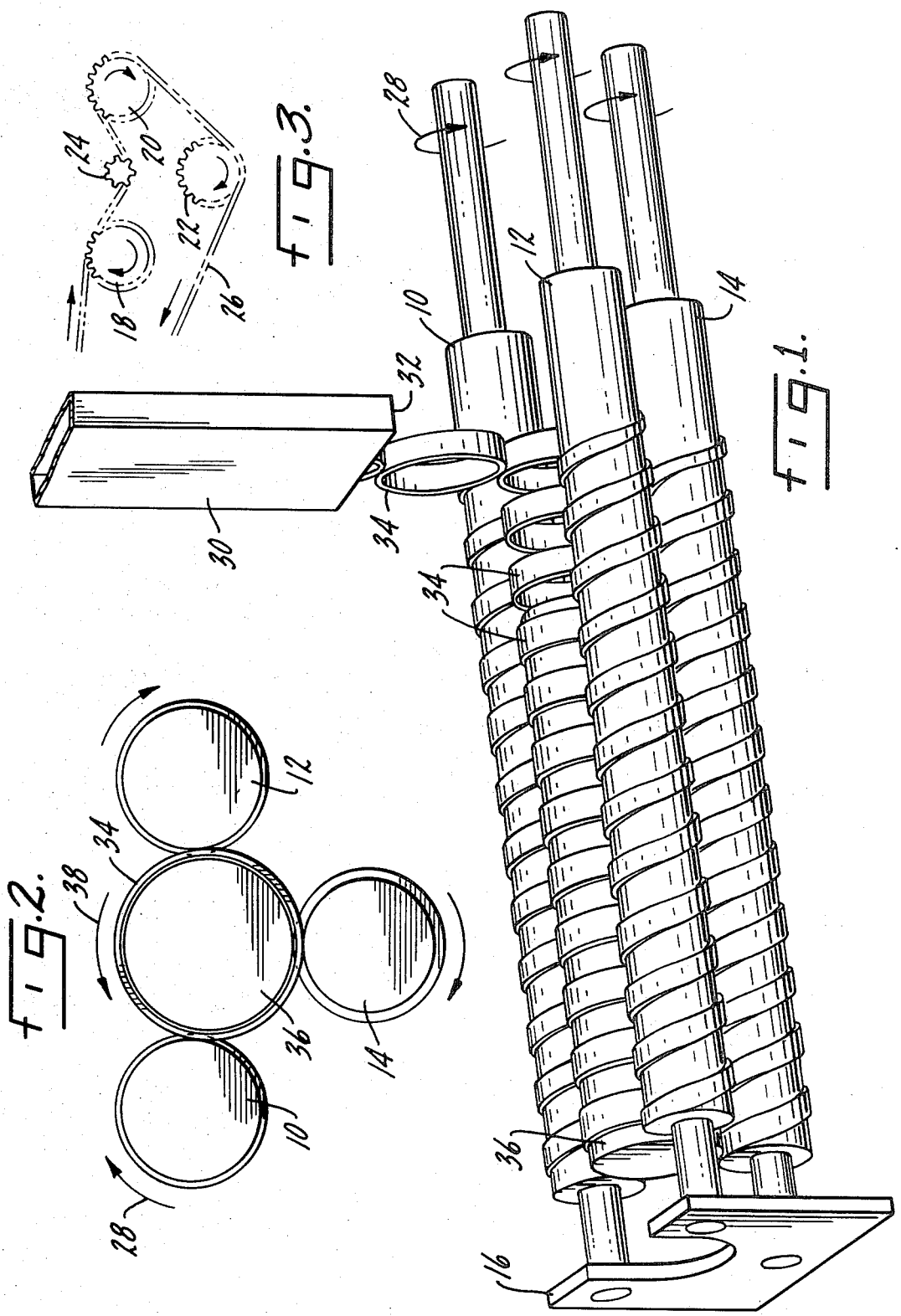

CORE HANDLING SYSTEM

SUMMARY OF THE INVENTION

The present invention relates to a system for automatically locating and positioning cylindrical objects on a mandrel.

A primary purpose of the invention is a core handling system in which the cores are spaced on a mandrel by the use of a plurality of threaded rods.

Another purpose is a core handling system of the type described in which the spacing between cores is equal to the width of the core.

Another purpose is a core handling system, simple in construction and reliably operable.

Another purpose is a system for positioning and locating cylindrical objects on a mandrel which may be an air-expanded mandrel.

Another purpose is a core handling system which may be used either to position cylindrical cores on a mandrel or to remove cylindrical cores from the mandrel.

Other purposes will appear in the ensuing specification, drawings and claims.

BRIEF DESCRIPTION OF THE DRAWINGS

The invention is illustrated diagrammatically in the following drawings wherein:

FIG. 1 is a perspective of a core handling system of the type described,

FIG. 2 is an end view of the threaded rods and mandrel, and

FIG. 3 is a diagrammatic illustration of the drive for the threaded rods.

DESCRIPTION OF THE PEFERRED EMBODIMENT

The present invention has application in positioning cylindrical objects such as the paper cores upon which tape is wound. The invention obviously has substantially wider use. The mechanism shown and described has application in positioning and locating any type of cylindrical object on a mandrel. Preferably the objects are identical or at least have the same inside and outside diameter. The invention will be described in connection with a system for loading cores onto a cylindrical mandrel. It should be understood that merely be reversing the direction of rotation of the threaded rods, a fully loaded mandrel may be positioned between the rods and the cores removed.

In the past, it was necessary for an operator to manually load the cores on a mandrel or the like. The present invention provides automatic core loading which provides substantially greater productivity from the slitter-winder tape winding machine. It should be understood that in some applications, the core need not be cylindrical, but may take on other cross sections, for example square.

In FIG. 1, threaded rods are indicated at 10, 12 and 14. The rods are substantially identical, as are the threads on the rods. The left-hand ends of rods 10, 12 and 14 are journaled in a support 16 which permits the rods to freely rotate. The rods 10, 12 and 14 may be driven in any suitable manner, for example each may have a gear 18, 20 and 22, respectively, fixed on their right-hand ends. An idler gear is indicated at 24 and a suitable chain or the like 26 may pass around each of gears 18, 20 and 22, as well as the idler gear 24, so that the rods are driven in the direction of arrows 28 at the same speed.

Positioned above one end of the threaded rods is a source of paper cores indicated at 30, which has a bottom discharge opening 32 through which a core 34 has just passed. Note that each of the cores, as it passes from the discharge opening of the chute, falls down to the space between the threaded rods. The axes of the rods together form the three corners of a triangle. Rods 10 and 12 are generally parallel to each other and spaced apart, with rod 14 being positioned midway between the other two rods and beneath them. In effect, they are parallel and radially spaced, one from another.

A mandrel 36 is positioned in the space defined by the three rods. Note FIG. 2. With each of the threaded rods moving in the direction of arrows 28 in FIG. 2, the mandrel 36 will move in the direction of arrow 38. The mandrel is supported on the outer diameter of bottom threaded rod 14 and is closely adjacent to threaded rods 10 and 12. In effect, the mandrel fills the space defined by the three rods. The mandrel may take on a variety of shapes, although a cylindrical mandrel is preferred. The mandrel may be of the air-expanded type which permits positioning and expansion without jamming against the threads.

The threads on rods 10, 12 and 14 have a lead which is equal to twice the width of the core 34. Thus, when the cores are positioned on the mandrel, they will be spaced apart a distance equal to the width of the core. Such an arrangement is particularly satisfactory in the winding of rolls of tape as the mandrels may be placed adjacent each other, but in a staggered relation, so that tape will be simultaneously wound on all of the cores. The root of each of the threads has an axial width equal to the width of a core so that the core may lay completely down in the thread as each of the cores is carried by the threads onto the mandrel. The crest of the threads, however, may have a slightly greater width to facilitate the passing of the cores onto the mandrel and to facilitate the positioning of the cores in the space defined between the threaded rods.

In operation, the three rods will rotate in the direction shown. The cores will pass from the chute to the space defined between the rods and at a location in register with the first thread of each of the rods. In this connection, the entry end of the threads may have an increased root diameter and increased groove width to facilitate entry of the cores into position between the rods. The cores will nest in the space between the rods and will be axially moved by the threads onto the mandrel. The thread on bottom rod 14 may be slightly deeper than the threads on the other rods to assure ample clearance for the cores to move freely onto the mandrel. The size of the mandrel is consistent with the inside diameter of the cores and the cores will be moved down the mandrel as they are carried by the threads on the rods. Successive cores will follow the first and as soon as the mandrel has a complete load of cores, it will be removed from position between the rods. A new mandrel may be positioned, either automatically or manually, in a timed relationship such that the flow of cores may be continuous. A fully loaded mandrel may be removed in a vertical direction directly out of contact with the rods or it may be dropped either to the left or right by moving the bottom rod away from the mandrel. In some applications it may be necessary to have a momentary lull in the discharge of cores to allow for a replacement of the mandrel. In any event, the cores will be moved down the mandrel by the threads with the spacing between cores being equal to the width of the core. In some operations the spacing may be varied, and the spacing described above is typical for use in a tape winding operation.

Within the scope of the invention is to use the mechanism shown as a means for removing cores from the mandrel. For example, a fully loaded mandrel may be placed in position as shown in FIG. 1, with the rods being driven in the opposite direction. This action would result in the cores being removed from the mandrel, rather than being loaded onto it.

Whereas the preferred form of the invention has been shown and described herein, it should be realized that there may be many modifications, substitutions and alterations thereto.

We claim:

1. In a mechanism for positioning objects on a mandrel, a plurality of parallel elongated threaded members, radially spaced from each other, a mandrel positioned between and parallel with said elongated threaded members, means for rotating said threaded members, a source of objects, a discharge opening for said source spaced from one end of said mandrel, objects passing from said discharge opening to a position between said threaded members being carried by the threads along a path in alignment with the mandrel and parallel to said threaded members onto the mandrel.

2. The structure of claim 1 further characterized in that there are three threaded members.

3. The structure of claim 2 further characterized in that the threads on each of the threaded members are substantially identical.

4. The structure of claim 3 further characterized in that the lead of the threads on each of the threaded members is equal to twice the width of an object.

5. The structure of claim 2 further characterized in that the mandrel is supported on one of said threaded members.

6. The structure of claim 1 further characterized in that said source of objects includes a chute positioned above the space between said threaded members.

7. The structure of claim 1 further characterized in that said objects are cylindrical and identical with the lead of the threads on the threaded members being equal to twice the width of a cylindrical member.

8. The structure of claim 7 further characterized in that the width of the threads at the root is equal to the width of a cylindrical object.

9. The mechanism of claim 1 further characterized in that each of said threaded members is driven in the same direction, at the same rate of speed, with each of said threaded members having substantially identical threads.

10. In a mechanism for moving cylindrical objects onto and off of a cylindrical mandrel, a plurality of elongated threaded members having identical threads and radially spaced from each other, means for rotating said threaded members, a mandrel positioned between said threaded members and supported for rotation by one of said threaded members, rotation of said threaded members causing cylindrical objects to be moved, by the threads, onto and off of said mandrel.

* * * * *